(12) United States Patent
Jung et al.

(10) Patent No.: US 7,221,425 B2
(45) Date of Patent: May 22, 2007

(54) SUBSTRATE FOR A DISPLAY DEVICE, LIQUID CRYSTAL DISPLAY DEVICE COMPRISING OVERLAPPING CONNECTING LINES OF THE SCAN LINES AND METHOD OF MANUFACTURING THE SAME

(75) Inventors: Young-Bae Jung, Suwon-si (KR); Won-Kyu Lee, Seongnam-si (KR)

(73) Assignee: Samsung Electronics Co., Ltd. (KR)

( * ) Notice: Subject to any disclaimer, the term of this patent is extended or adjusted under 35 U.S.C. 154(b) by 68 days.

(21) Appl. No.: 10/660,003

(22) Filed: Sep. 11, 2003

(65) Prior Publication Data

US 2004/0051836 A1    Mar. 18, 2004

(30) Foreign Application Priority Data

Sep. 16, 2002    (KR) .................... 10-2002-0056070

(51) Int. Cl.
*G02F 1/1345* (2006.01)
(52) U.S. Cl. .................. 349/149; 349/151; 349/152
(58) Field of Classification Search ............... 349/139, 349/143, 149, 151–152, 147, 148
See application file for complete search history.

(56) References Cited

U.S. PATENT DOCUMENTS 4,586,789 A * 5/1986 Kishimoto et al. ......... 349/152
6,025,891 A * 2/2000 Kim ........................... 349/40
6,323,930 B1 * 11/2001 Higuchi et al. ............. 349/152
6,665,037 B2 * 12/2003 Hagiwara .................... 349/148
6,700,636 B2 * 3/2004 Kim et al. ................... 349/139
6,806,938 B2 * 10/2004 Asakura et al. ............. 349/151
6,853,361 B2 * 2/2005 Tsuyuki et al. ............... 345/92
2002/0071086 A1 * 6/2002 Kim et al. .................. 349/152
2002/0080318 A1 * 6/2002 Yamate et al. .............. 349/149
2002/0145696 A1 * 10/2002 Kim ........................... 349/149
2002/0191140 A1 * 12/2002 Eguchi et al. .............. 349/149
2003/0063080 A1 * 4/2003 Takahashi et al. .......... 345/211
2003/0112382 A1 * 6/2003 Takahashi et al. ............ 349/43
2004/0012744 A1 * 1/2004 Ishige et al. ................ 349/139
2004/0141138 A1 * 7/2004 Komeno et al. ............ 349/149

FOREIGN PATENT DOCUMENTS

JP            05150263 A  *  6/1993
JP         2000276073 A  *  10/2000

* cited by examiner

*Primary Examiner*—Andrew Schechter
*Assistant Examiner*—W. Patty Chen
(74) *Attorney, Agent, or Firm*—Cantor Colburn LLP

(57) ABSTRACT

A substrate for a display device has a reduced size and weight. Connecting lines are formed on peripheral region adjacent to display region of a display device, and scan driving signal is applied to scan lines through the connecting lines. The connecting lines includes first connecting lines and second connecting lines. The first connecting lines are formed in a same layer as the scan lines, and the second connecting lines are formed in a same layer as the data lines. The total area of the wirings formed in the peripheral region is reduced, and the size and weight of the liquid crystal display device may be reduced.

26 Claims, 17 Drawing Sheets

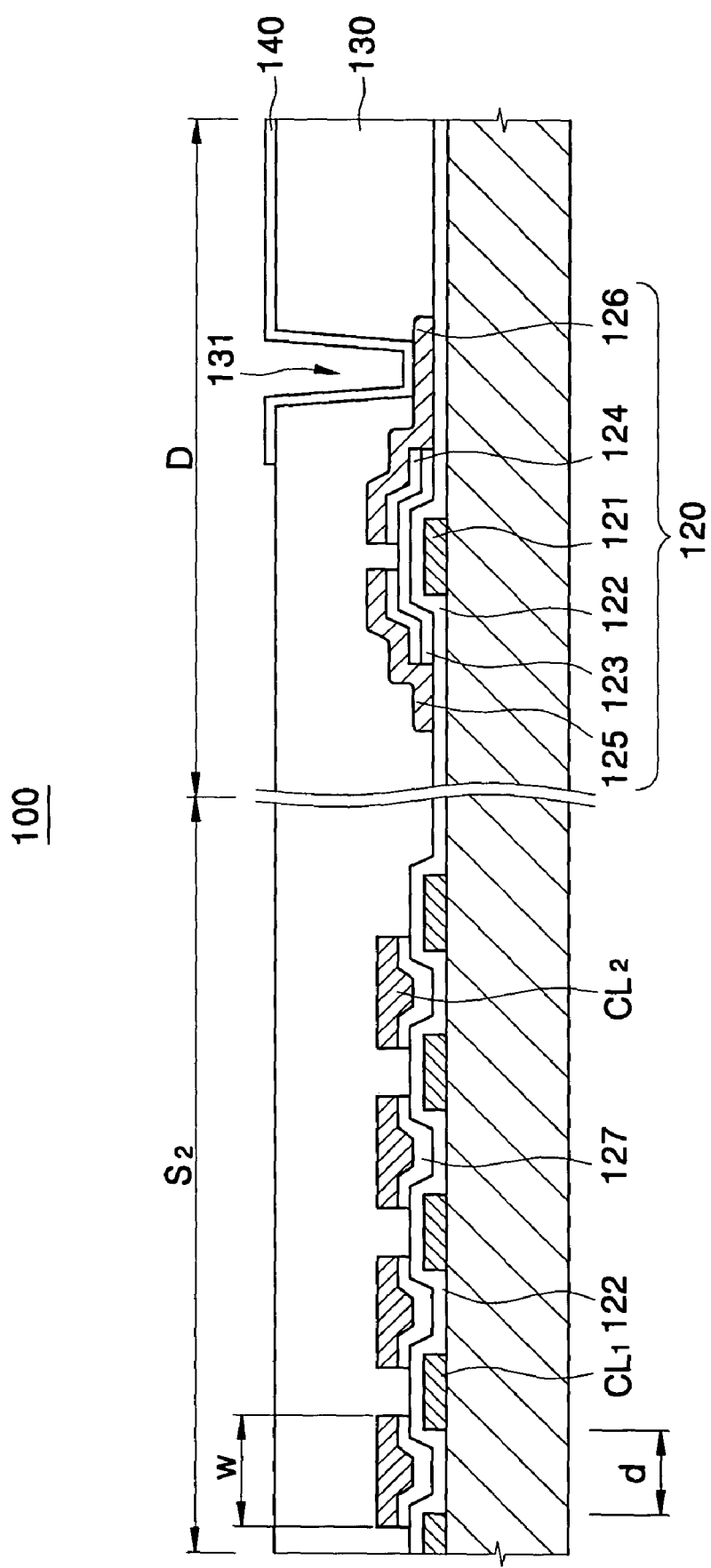

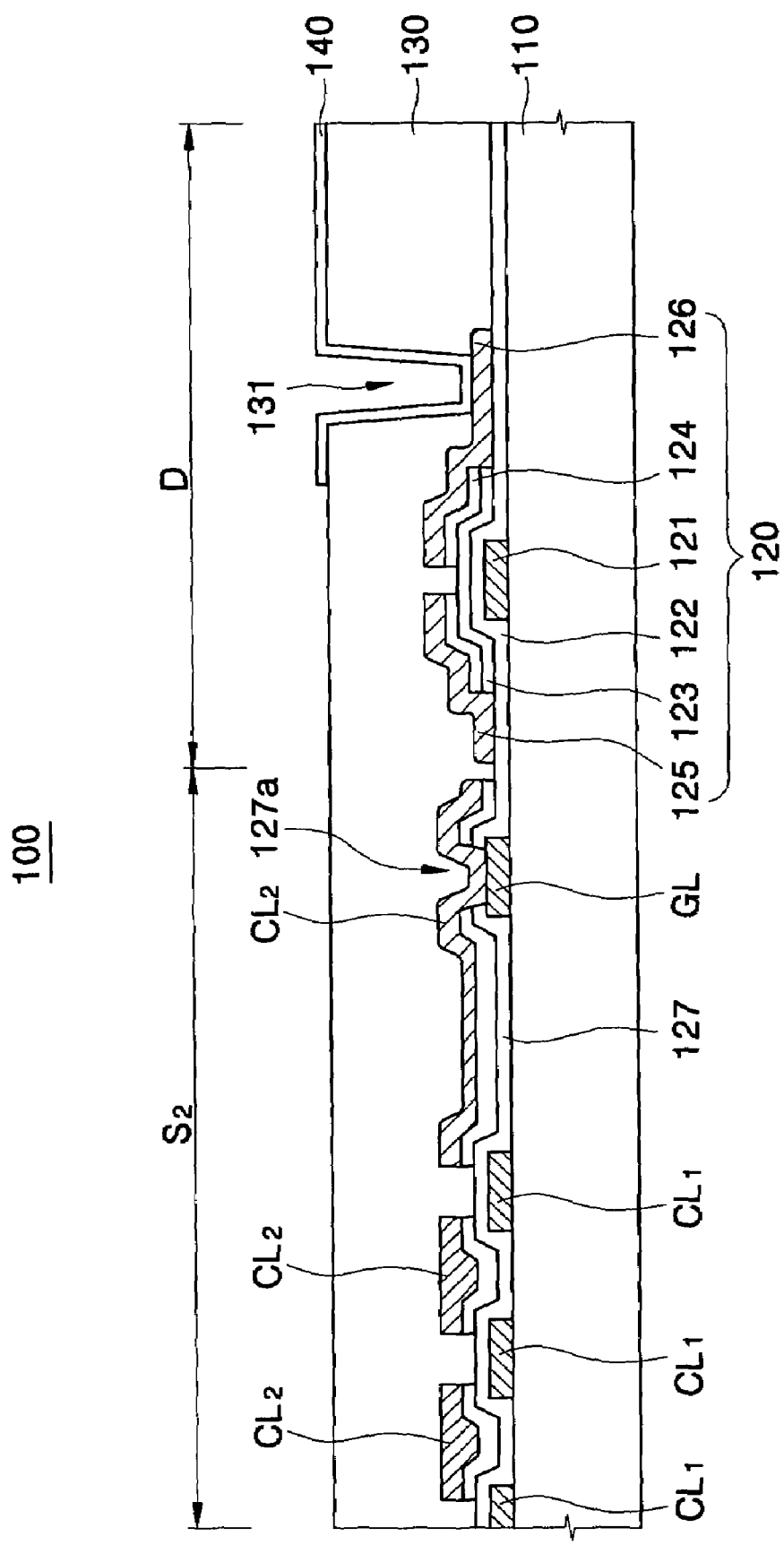

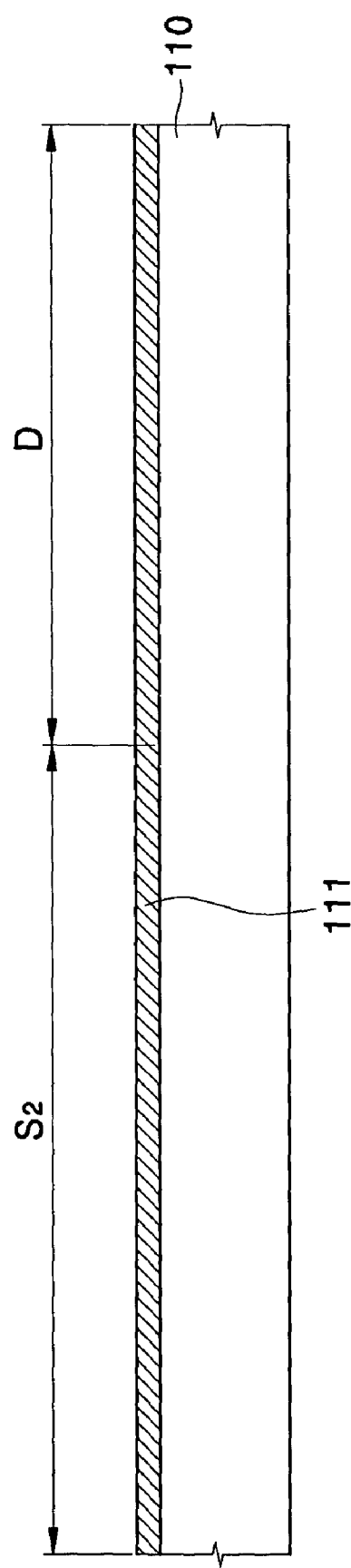

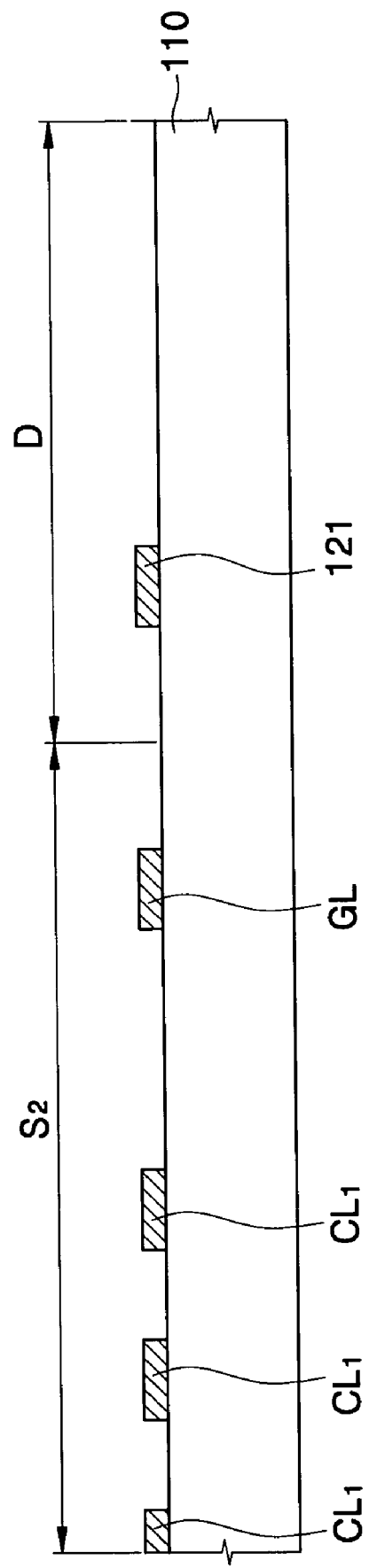

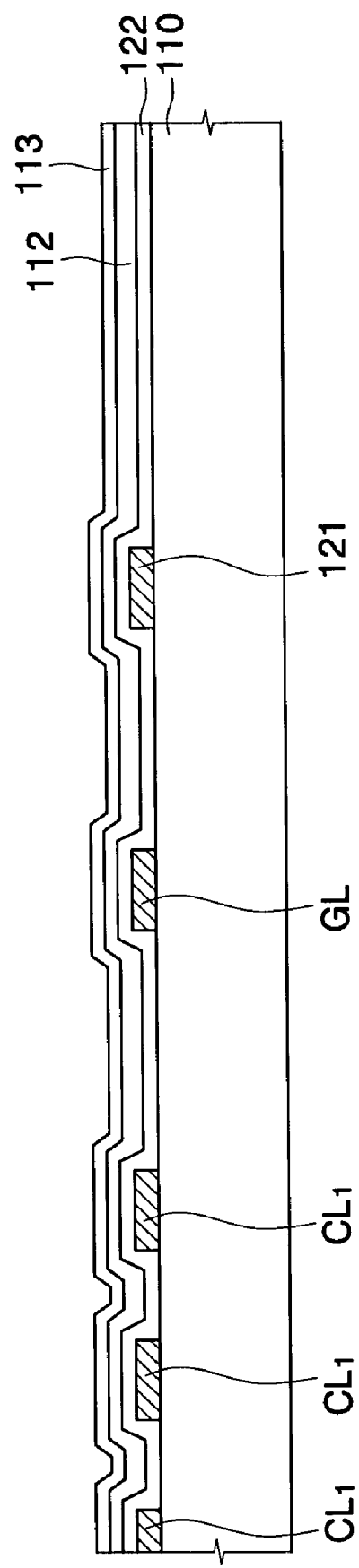

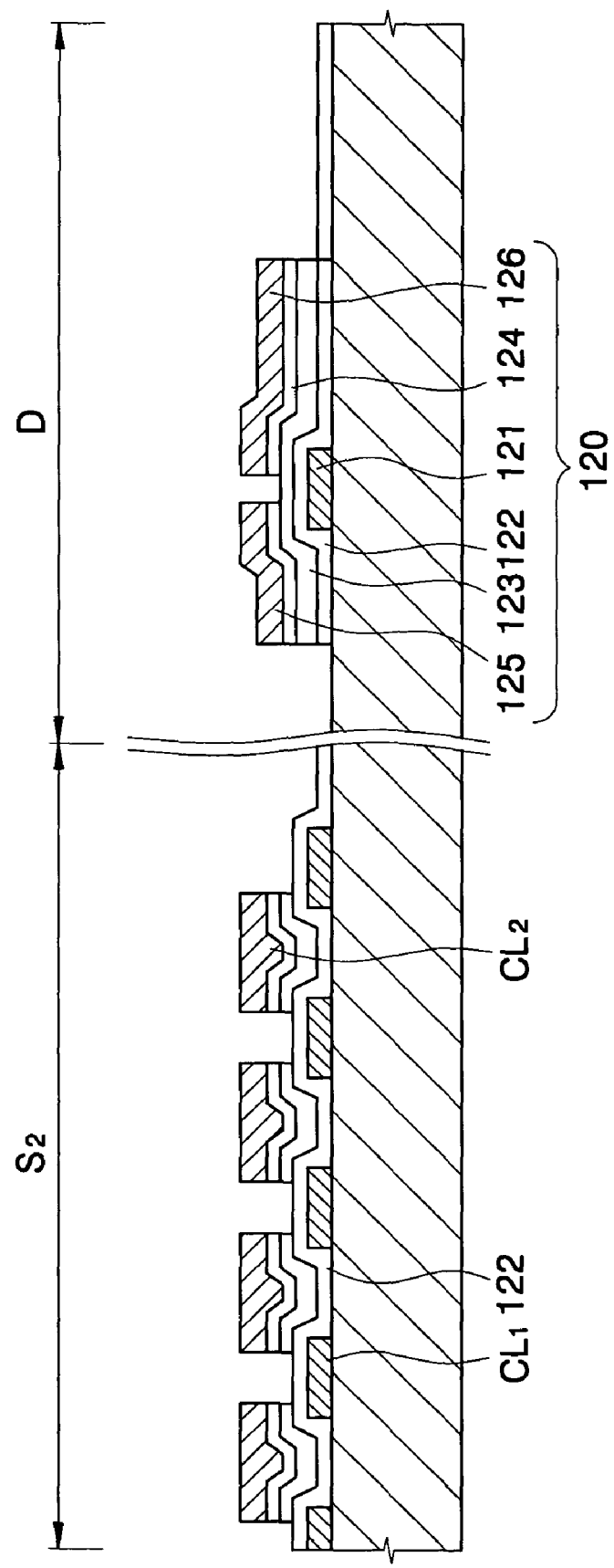

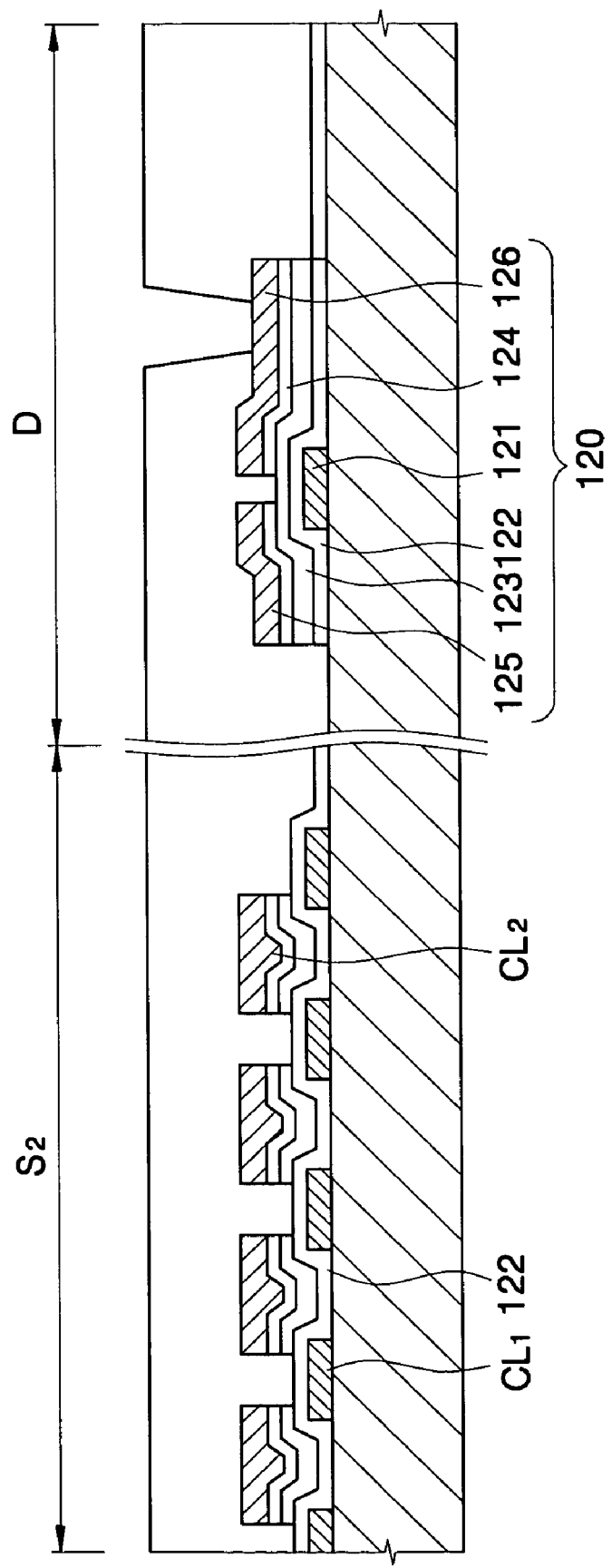

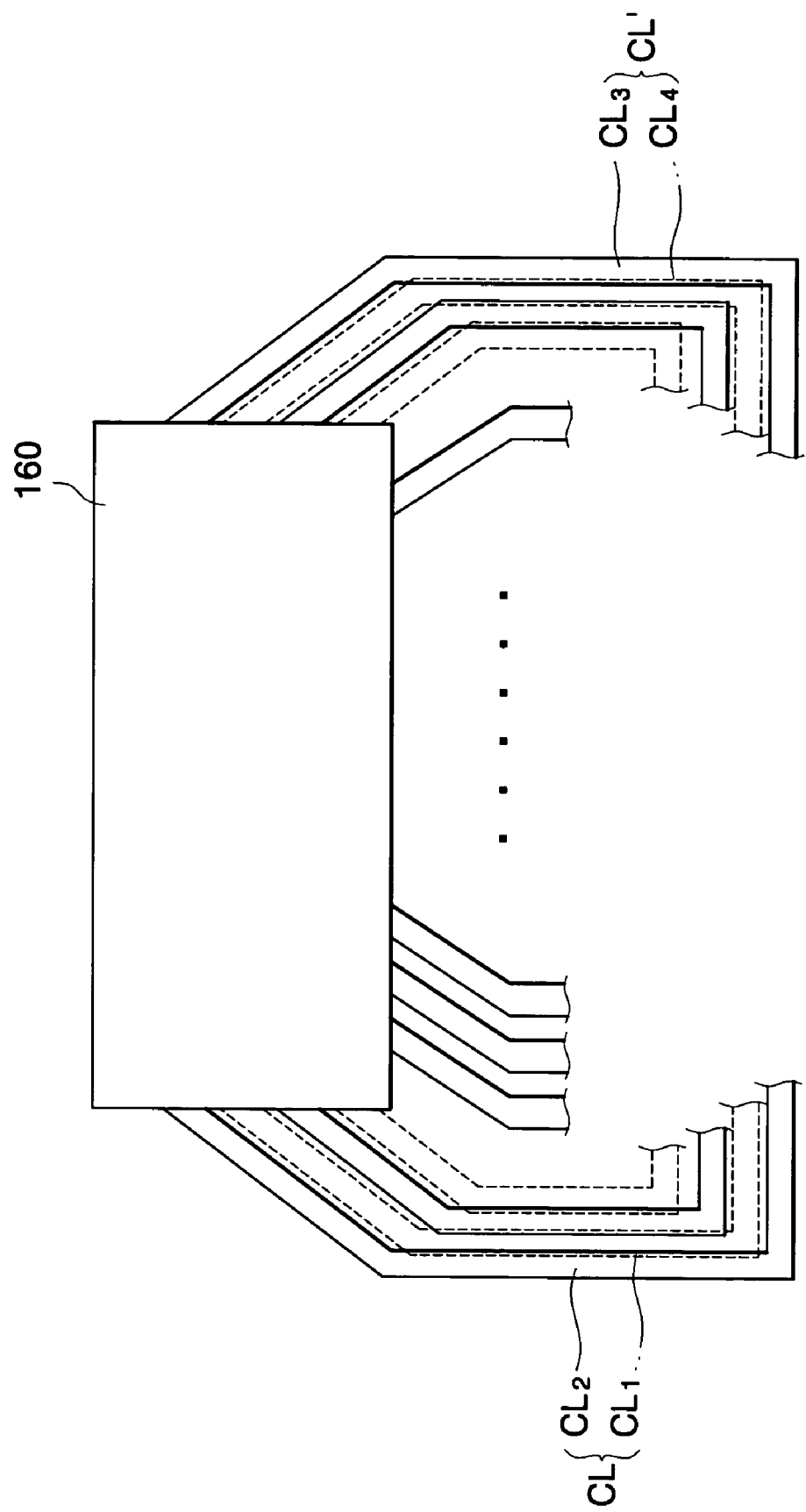

SUBSTRATE FOR A DISPLAY DEVICE, LIQUID CRYSTAL DISPLAY DEVICE COMPRISING OVERLAPPING CONNECTING LINES OF THE SCAN LINES AND METHOD OF MANUFACTURING THE SAME

CROSS-REFERENCE TO RELATED APPLICATIONS

The application relies for priority upon Korean Patent Application No. 2002-56070 filed on Sep. 16, 2002, the contents of which are herein incorporated by reference in its entirety.

BACKGROUND OF THE INVENTION

1. Field of the Invention

The disclosure relates to a substrate used for a display device, a liquid crystal display device, and a method of manufacturing the liquid crystal display (LCD) device, more particularly to a substrate used for a display device, a liquid crystal display device, and a method of manufacturing the liquid crystal display device that has a reduced size and weight.

2. Description of the Related Art

In general, the liquid crystal display device includes a liquid crystal display panel for displaying an image, and the liquid crystal display panel has a first substrate, a second substrate and a liquid crystal layer interposed between the first and second substrate.

A driver printed circuit board used for driving the liquid crystal display panel is electrically connected to the liquid crystal display panel through a tape carrier package (TCP).

The driver printed circuit board includes a data printed circuit board and a gate printed circuit board. The data printed circuit board drives a plurality of data lines formed on the liquid crystal display panel, and the gate printed circuit board drives a plurality of scan lines (or gate lines) formed on the liquid crystal display panel.

The data printed circuit board is electrically connected with the data lines through a data side TCP, and the gate printed circuit board is electrically connected with the scan lines through a gate side TCP. A data driver chip is disposed in the data side TCP, and a scan driver chip (or a gate driver chip) is disposed in the gate side TCP.

Recently, a scan driver circuit (or gate driver circuit) is formed on the liquid crystal display panel so that the number of steps for manufacturing the liquid crystal display device may be reduced. The scan driver circuit provides the scan lines with a scan driving signal.

Particularly, the first substrate or the second substrate of the liquid crystal display panel includes a display region and a peripheral region.

The scan driver circuit is formed on the peripheral region adjacent to first ends of the scan lines.

However, since the scan driver circuit is formed at first ends of the scan lines, the liquid crystal display panel does not have symmetric structure. When another space is provided at second ends of the scan lines so as to provide symmetric structure, the size of the liquid crystal display device may increase.

SUMMARY OF THE INVENTION

Accordingly, the present invention is provided to substantially obviate one or more problems due to limitations and disadvantages of the related art.

It is a first feature of the present invention to provide a substrate used for a display device so that the size and weight of the display device may be reduced.

It is a second feature of the invention to provide a liquid crystal display device having the substrate so that the size and weight of the liquid crystal display device may be reduced.

It is a third feature of the invention to provide a method of manufacturing the liquid crystal display device.

According to one aspect of the present invention, there is provided a substrate for a display device, the substrate includes a first substrate, a driver section and a first connecting part. The first substrate includes a display region and a peripheral region adjacent to the display region. The display region has a plurality of pixels, a plurality of data lines and a plurality of scan lines, and the peripheral region has a first peripheral region adjacent to first ends of the data lines and a second peripheral region adjacent to first ends of the scan lines. The driver section includes a scan driver circuit and a data driver circuit. The scan driver circuit and the data driver circuit are formed in the first peripheral region, the scan driver circuit provides the scan lines with a scan driving signal, and the data driver circuit provides the data lines with a data signal. The first connecting part is formed in the second peripheral region to be coupled to the first ends of the scan lines. The first connecting part includes a plurality of groups, each of the groups is disposed in first layers different from each other, and the scan driving signal is applied to the first connecting part.

According to another aspect of the present invention, there is provided a substrate for a display device. The substrate includes a first substrate, a driver section and a first connecting part. The first substrate includes a display region and a peripheral region adjacent to the display region. The display region has a plurality of pixels, a plurality of data lines and a plurality of scan lines, and the peripheral region has a second peripheral region adjacent to first ends of the scan lines. The driver section includes a scan driver circuit and a data driver circuit. The scan driver circuit and the data driver circuit are formed in the peripheral region. The scan driver circuit provides the scan lines with a scan driving signal, and the data driver circuit provides the data lines with a data signal. The first connecting part is formed in the second peripheral region to be coupled to the first ends of the scan lines, and the first connecting part includes a plurality of groups. Each of the groups is disposed in first layers different from each other, and the scan driving signal is applied to the first connecting part.

According to still another aspect of the present invention, there is provided a liquid crystal display device including a liquid crystal display panel, a driver section and a first connecting part. The liquid crystal display panel includes a first substrate, a second substrate facing the first substrate, and a liquid crystal layer disposed between the first and second substrates. The first substrate includes a display region and a peripheral region adjacent to the display region. The display region has a plurality of pixels, a plurality of data lines and a plurality of scan lines. The peripheral region has a first peripheral region adjacent to first ends of the data lines and a second peripheral region adjacent to first ends of the scan lines. The driver section includes a scan driver circuit and a data driver circuit. The scan driver circuit and the data driver circuit are formed in the first region. The scan driver circuit provides the scan lines with a scan driving signal, and the data driver circuit provides the data lines with a data signal. The first connecting part is formed in the second region to be coupled to the first ends of the scan lines, and the first connecting part includes a plurality of groups. Each of the groups is disposed in first layers different from each other, and the scan driving signal is applied to the first connecting part.

According to still another aspect of the present invention, there is provided a method of manufacturing a liquid crystal display device. A first substrate is formed. The first substrate includes a display region and a peripheral region adjacent to the display region. The display region has a plurality of data lines, a plurality of scan lines, a plurality of pixels and a connecting part. Each of the pixels has a switching device electrically coupled to one of the scan lines and one of the data lines. The connecting part is formed in the peripheral region adjacent to first ends the scan lines, and the connecting part has a plurality of groups disposed in layers different from each other. The first substrate is combined with a second substrate. A liquid crystal is interposed between the first and second substrates.

According to the use of the substrate for a display device, the liquid crystal display device and the method of manufacturing the liquid crystal display device, the connecting lines includes first connecting lines and second connecting lines. The first connecting lines are formed from the same layer as the scan lines, and the second connecting lines are formed from the same layer as the data lines.

The total areas of the peripheral region, in which the connecting lines are formed, are reduced, and the size and weight of the liquid crystal display device may be reduced.

In addition, although the first and second connecting lines are formed in different layers, the number of manufacturing processes may not increase because the first connecting lines are formed in the process in which the scan lines are formed and the second connecting lines are formed in the process from which the data lines are formed.

BRIEF DESCRIPTION OF THE DRAWINGS

The above and other advantages of the present invention will become more apparent by describing in detail exemplary embodiments thereof with reference to the accompanying drawings, in which:

FIG. 4 is a sectional view taken along the line A–A' of FIG. 3;

FIG. 5 is a sectional view taken along the line B–B' of FIG. 3;

FIGS. 6A–6G are sectional views showing one exemplary method of manufacturing the TFT substrate of FIG. 5;

FIGS. 7A, 7B and 7C are sectional views showing another exemplary method of manufacturing the TFT substrate of FIG. 5;

FIG. 9 is a schematic view showing the wirings branched from a driver section of FIG. 8.

DETAILED DESCRIPTION OF THE PREFERRED EMBODIMENTS

Hereinafter the preferred embodiment of the present invention will be described in detail with reference to the accompanying drawings.

Hereinafter, a control electrode of a transistor represents a gate electrode of the transistor, a first current electrode of the transistor represents a source electrode (or a drain electrode) of the transistor, and a second current electrode of the transistor represents a drain electrode (or a source electrode) of the transistor.

Figure 1:
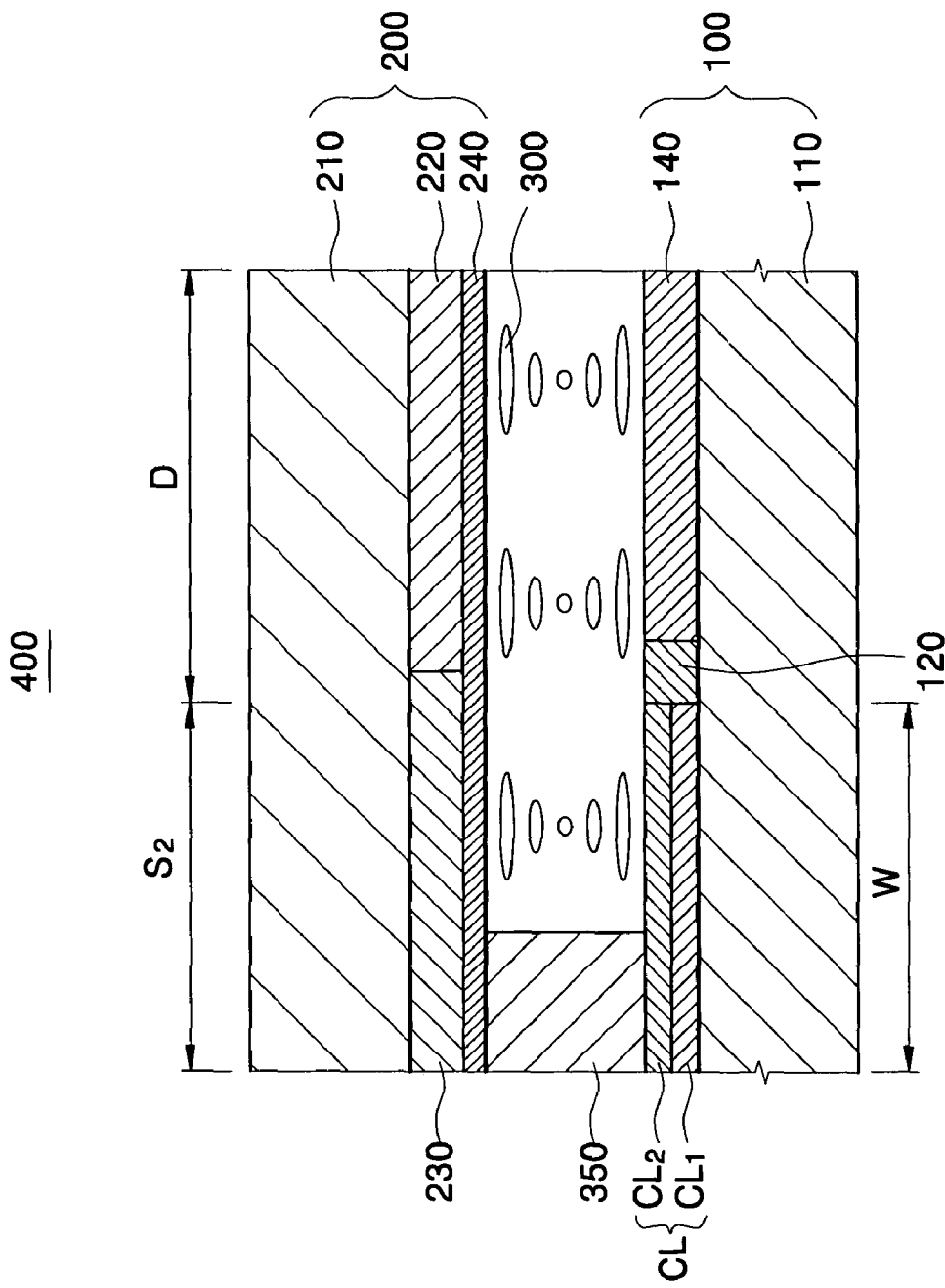
FIG. 1 is a sectional view showing an LCD device according to one exemplary embodiment of the present invention.

FIG. 1 is a sectional view showing an LCD device according to one exemplary embodiment of the present invention.

Referring to FIG. 1, a liquid crystal display device 400 includes a liquid crystal display panel, and the liquid crystal display panel includes an TFT substrate 100, a color filter (C/F) substrate 200 facing the TFT substrate 100, and a liquid crystal layer 300 interposed between the TFT substrate 100 and the C/F substrate 200.

The liquid crystal display panel has a display region (D) and first and second peripheral regions (S1, S2). An image is displayed through the display region D, and the first and second peripheral regions (S1, S2) are disposed adjacent to the display region D.

Particularly, the TFT substrate 100 includes a plurality of scan lines (or gate lines, not shown) and a plurality of data lines (not shown). The scan lines and data lines are formed on a first substrate. Pixel regions (or pixels) are defined by the scan lines and the data lines. The pixel regions respectively include a TFT 120 and a pixel electrode 140 connected to the TFT 120.

In organic electroluminescence (EL) display device, the pixel regions respectively may have an organic electroluminescence cell. For example, the EL cell may include a switching transistor, a storage capacitor (Cst), a driving transistor, a power supplying line and an EL element.

In addition, the TFT substrate 100 includes a plurality of connecting lines CL. The connecting lines are formed in the second peripheral region S2, and an external scan driving signal is sequentially applied to the scan lines. The connecting lines CL include a first connecting line CL1 and a second connecting line CL2. The first connecting line CL1 is formed from the same layer as the gate electrode of the TFT 120, and the second connecting line CL2 is formed from the same layer as the source electrode and the drain electrode. Since the connecting lines CL have double layers, the width (W) of the second connecting line CL2 may be reduced.

The C/F substrate 200 includes a color filter 220, a shielding layer 230 and a common electrode 240. The color filter 210 is formed on the second substrate 210 and the color filter 220 faces the display region D. The shielding layer 230 is formed on the second substrate 210 to face the second peripheral region S2. The common electrode 240 is uniformly formed on the color filter 220 and the shielding layer 230.

The shielding layer 230 shields the light exiting from the second peripheral region S2 of the TFT substrate 100 such that the connecting lines CL may not be reflected on the display screen of the liquid crystal display device 400.

After the TFT substrate 100 and the C/F substrate 200 are disposed such that the common electrode 240 and the pixel electrode 140 face each other, the TFT substrate 100 are fixed to the C/F substrate 200 by means of sealant 350. Liquid crystal is interposed between the TFT substrate 100 and the C/F substrate 200 to form the liquid crystal layer 300, so that the liquid crystal display device 400 is manufactured.

Figure 2:
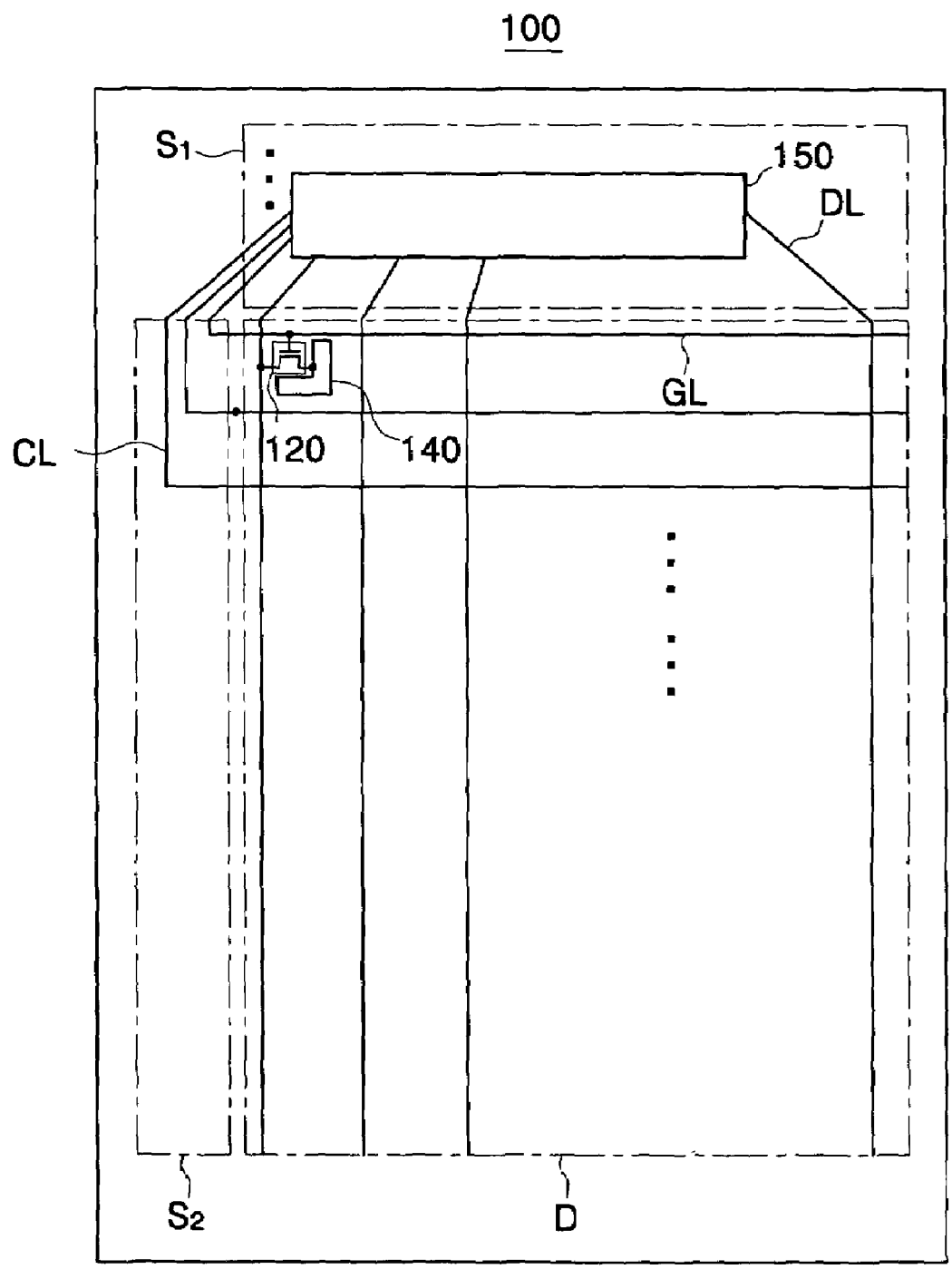
FIG. 2 is a plan view showing a thin film transistor (TFT) substrate according to one exemplary embodiment of the present invention.
Figure 3:
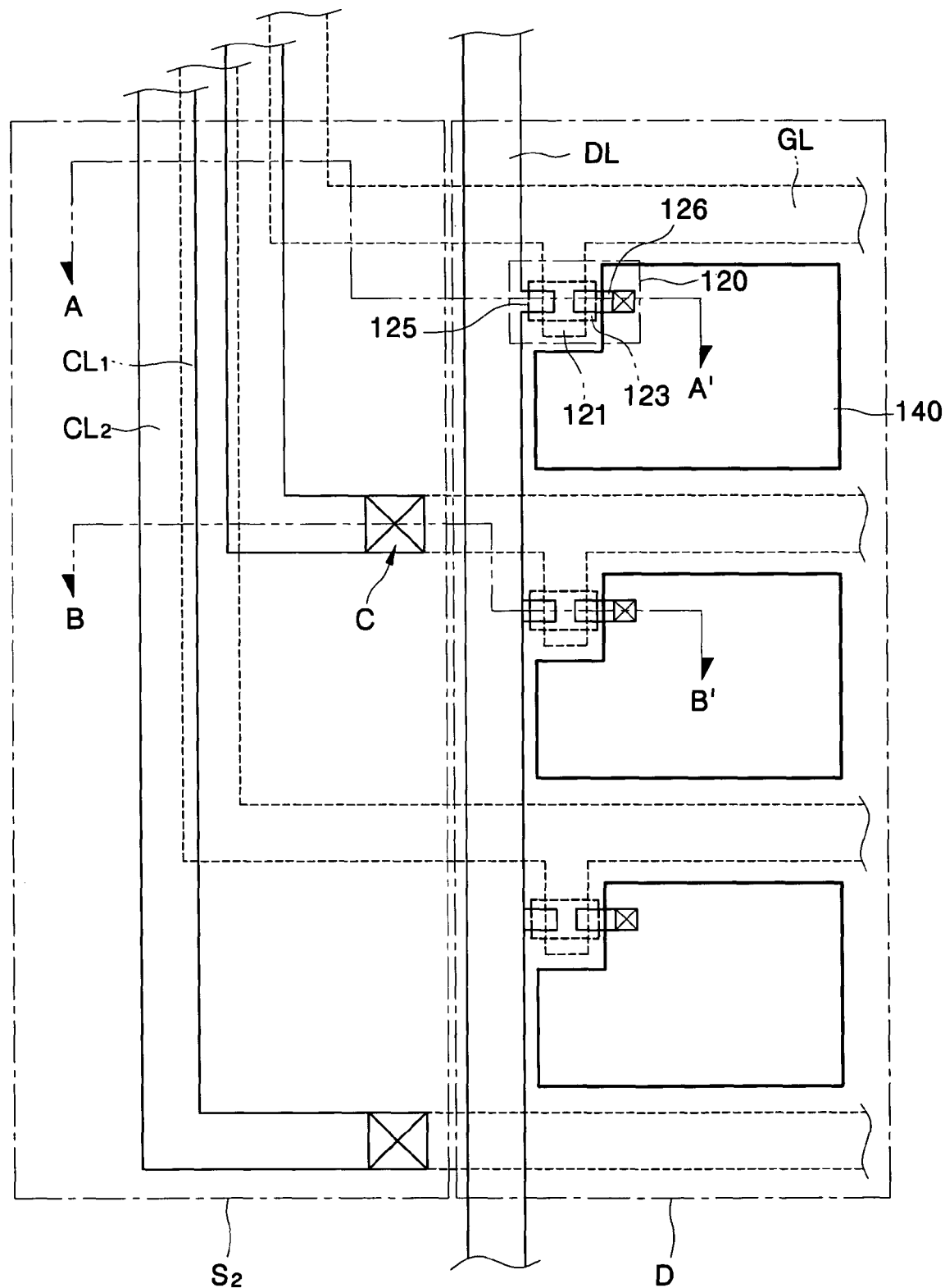
FIG. 3 is an enlarged view of a second peripheral region S2 of FIG. 2.

FIG. 2 is a plan view showing a thin film transistor (TFT) substrate according to one exemplary embodiment of the present invention, and FIG. 3 is an enlarged view of a second peripheral region S2 of FIG. 2.

Referring to FIGS. 2 and 3, the TFT substrate 100 includes a display region (D) and first and second peripheral regions (S1, S2). The first and second peripheral regions (S1, S2) are formed adjacent to the display region D.

A plurality of scan lines (SL, or gate lines GL) and a plurality of data lines (DL) are formed on the display region D. The scan lines are extended in a first direction, and the data lines (DL) are extended in a second direction substantially perpendicular to the first direction.

Pixel regions (or pixels) are defined by the scan lines and the data lines, and the pixel regions respectively include a TFT 120 and a pixel electrode 140 connected to drain electrode of the TFT 120.

Ends of the scan lines are disposed on the second peripheral region S2, and ends of data lines DL are disposed on the first peripheral region S2.

A driver section 150 is mounted in the first peripheral region S1. The driver section 150 may be a driver chip. The driver section 150 includes a scan driver circuit (or a gate driver circuit) and a data driver circuit. The scan driver circuit sequentially provides the scan lines (or gate lines) with a scan driving signal for driving the TFT 120. The data driver circuit provides the data lines with a data signal that is applied to the pixel electrode 140 according as the TFT 120 is turned on or turned off.

FIG. 4 is a sectional view taken along the line A–A' of FIG. 3, and FIG. 5 is a sectional view taken along the line B–B' of FIG. 3.

Referring to FIGS. 4 and 5, the TFT 120 includes a gate electrode 121, a source electrode 125 and a drain electrode.

The gate electrode 121 is insulated from the source electrode 125 and the drain electrode 126 by means of the gate insulation layer 122. An active pattern 123 and an ohmic contact pattern (or contact pattern) 124 are formed on the gate insulation layer 122. The data signal is applied to the drain electrode from the source electrode through the active pattern 123 and ohmic contact pattern 124. Hereinafter, the active pattern 123 and ohmic contact pattern 124 is referred to as a semiconductor layer. The drain electrode 126 and the source electrode 125 are formed on the ohmic contact pattern 124. The source electrode 125 is spaced apart from the drain electrode 126.

An organic insulation layer 130 is formed on the TFT 120. A first contact hole 131 is formed on the organic insulation layer 130. The first contact hole 131 exposes the drain electrode 126 and electrically connects between the drain electrode 126 and pixel electrode 140 formed on the organic insulation layer 130.

Connecting lines CL are formed in the second peripheral region S2. The connecting lines CL provide the scan lines with the scan driving signal outputted from the scan driver circuit. There is a one-to-one correspondence between the connecting lines CL and the scan lines (SL; or gate lines GL).

The connecting lines CL include a plurality of first connecting lines CL1 and a plurality of second connecting lines CL2. The first connecting lines CL1 are formed in a same layer as the gate electrode 121 and scan lines, and the second connecting lines CL2 are formed from the same layer as the data lines, source electrode 125 and the drain electrode 126. The first connecting lines CL1 are electrically insulated from the second connecting lines CL2 by means of the gate insulation layer 122. The first connecting line is electrically connected to odd numbered scan lines, and the second connecting lines are electrically connected to even numbered scan lines.

In addition, each of the second connecting lines CL2 may be disposed between two first connecting lines and partly overlap with two first connecting lines. In other words, the distance (d) between two first connecting lines CL1 is less than the width (w) of the second connecting line CL2.

The second connecting lines CL2, although not shown in FIG. 4, may be disposed in the space between two first connecting lines CL1. When the second connecting lines CL2 is disposed in the space between two first connecting lines CL1, the first horizontal distance between an edge of the first connecting line CL1 and an edge of the second connecting line CL2 is referred to as 'd1', the second horizontal distance between adjacent two first connecting lines is referred to as 'd2', d1 is less than (d2–w)/2.

The vertical distance between the first connecting lines is spaced apart by a predetermined distance. The vertical distance between the second connecting lines is also spaced apart by a predetermined distance. The vertical distance between the first and second connecting lines is also spaced apart by a predetermined distance. Therefore, electrical short between connecting lines may be prevented, and capacitance between connecting lines may be reduced.

The first connecting lines are spaced apart from each other along a horizontal direction, and the second connecting lines are spaced apart from each other along a horizontal direction. The first connecting lines are spaced apart from the second connecting lines along a vertical direction. Therefore, the total area occupied by the first and second connecting lines (CL1, CL2) may be reduced, the sum of the widths of the second peripheral regions S2 may be reduced. An insulating interlayer may be further formed between the second connecting lines CL2 and the gate insulation layer 122. The insulating interlayer is formed via the same process as the active pattern 123 and the ohmic contact pattern 124 of the TFT 120. An organic insulation layer 130 (or passivation layer) is formed on the gate insulation layer 122 and the second connecting lines CL2.

As shown in FIGS. 3 and 5, since the first connecting lines CL1 are formed from the same layer as the gate electrode 121 and the scan lines, each of the first connecting lines CL1 is connected to the corresponding scan line. Since the second connecting lines CL2 are formed from the same layer as the source electrode 125 and the drain electrode 126, each of the second connecting lines CL2 is electrically connected to the corresponding scan line through a second contact hole 127a.

The second contact hole 127a is formed at the insulating interlayer 127 and the gate insulation layer 122 both of which are formed under the second connecting lines CL2. The second contact hole 127a exposes ends of the even numbered scan lines. The second connecting lines CL2 are electrically connected to ends of the even numbered scan lines exposed by the second contact hole 127a.

FIGS. 6A–6E are sectional views showing one exemplary method of manufacturing the TFT substrate of FIG. 5.

Referring to FIG. 6A, a metal such as aluminum (Al), chrome (Cr), molybdenum tungsten (MoW), etc. is deposited on the first substrate 100 to from a metal layer 111. The first substrate 100 comprises an insulation material such as glass or ceramic.

As shown in FIG. 6B, the metal layer 111 is patterned via a photolithography process using a first photomask (not shown) so that a scan line extended in a first direction and a gate electrode 105 branched from the scan line are formed in the display region D.

First connecting lines CL1 each of which are spaced apart from each other are formed on the second peripheral region S2.

Next, referring to FIG. 6C, a silicon nitride ($Si_xN_y$) layer is formed on the first substrate 110 on which the gate electrode 121, scan line and the first connecting lines CL1, thereby forming a gate insulation layer 122. The silicon nitride layer is formed by a plasma chemical vapor deposition method.

As shown in FIG. 6C, an amorphous silicon layer is formed on the gate insulation layer 122 by a plasma chemical vapor deposition method, thereby forming an active layer 112. An in-situ doped n+ amorphous silicon layer is deposited on the active layer 112 by the plasma chemical vapor deposition method, thereby forming an ohmic contact layer 113.

Figure 6D:
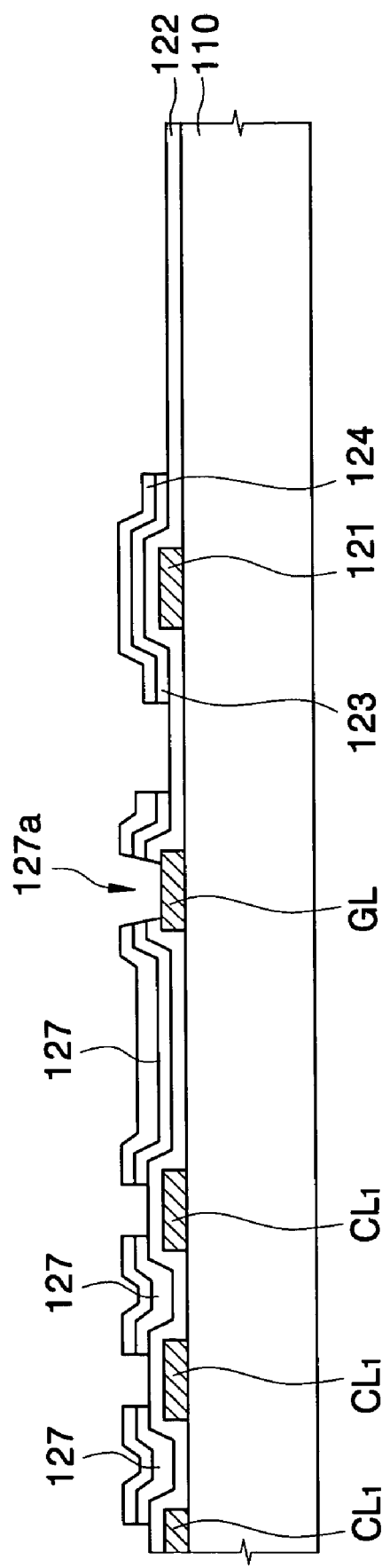

Referring to FIG. 6D, the ohmic contact layer 113 and the active layer 112 are patterned to form a semiconductor layer 130, i.e. an active pattern 123 and an ohmic contact pattern 124, on the gate insulation layer 120 under which the gate electrode 105 is positioned. The active pattern 123 comprises amorphous silicon layer, and the ohmic contact pattern 124 comprises n+ doped amorphous silicon layer.

In addition, an insulating interlayer 127 comprising the active pattern 123 and the ohmic contact pattern 124 is formed on the gate insulation layer to be disposed between the first connecting lines CL1.

The thickness of the regions between the first connecting lines CL1 is uniformized by the insulating interlayer 127. In addition, since the second connecting lines CL2 are spaced apart from the first connecting lines by the insulating interlayer 127, the parasitic capacitance between the first and second connecting lines CL1 and CL2 is reduced.

A second contact hole 127a is formed on the insulating interlayer 127 and the gate insulation layer 122 by a photolithography method using a second photomask (not shown). The second contact hole 127a exposes ends of the even numbered scan lines so that the second connection lines CL2 are electrically connected to the even numbered scan lines.

Figure 6E:
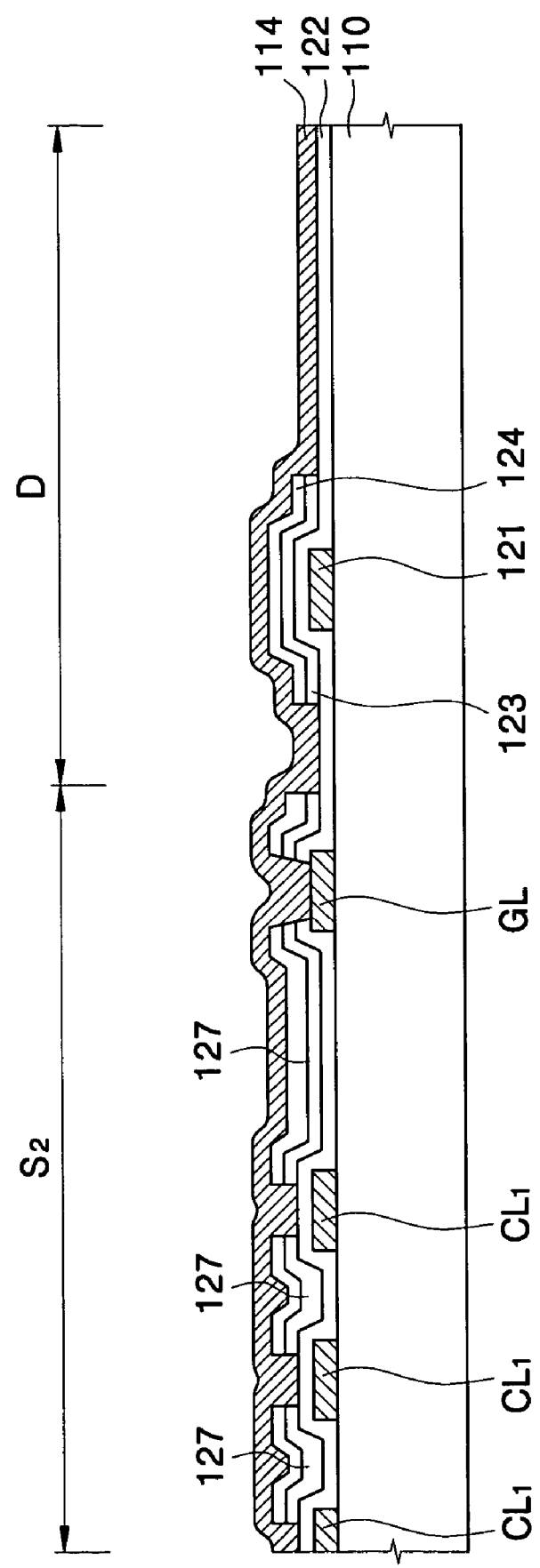

Referring to FIG. 6E, a second metal such as chrome (Cr) is deposited on the first substrate 110 on which the gate insulation layer 122 and the insulating interlayer 127 to from a second metal layer 114.

Figure 6F:
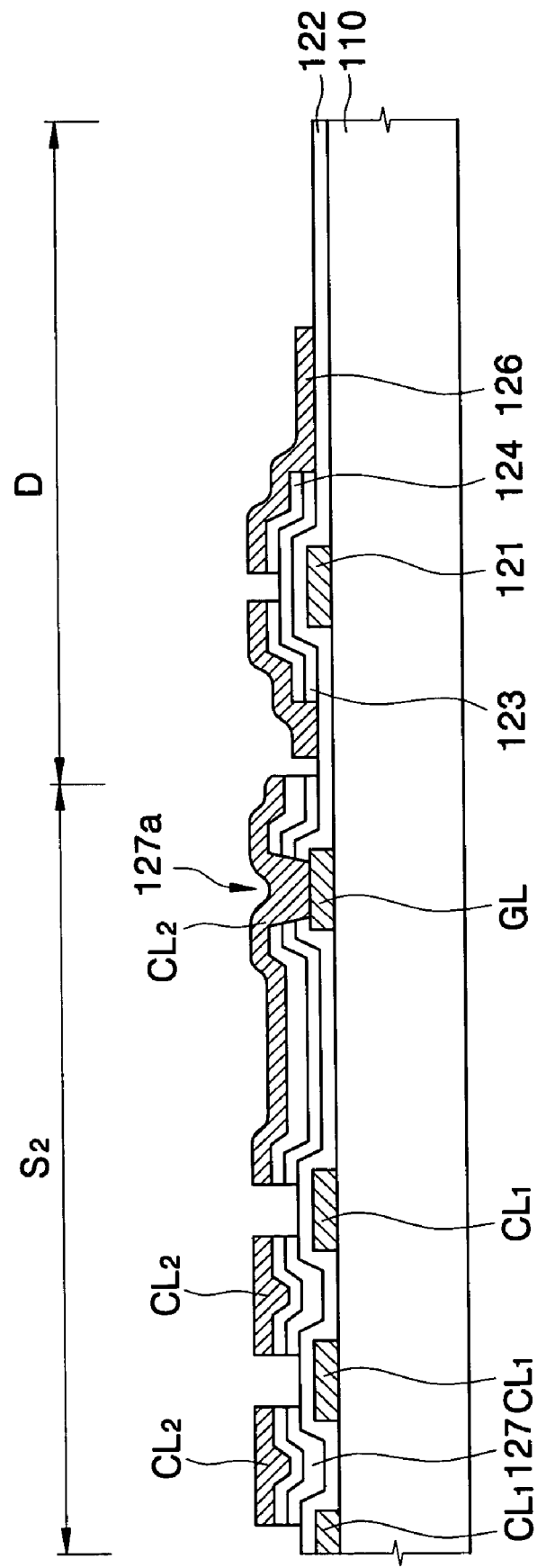

As shown in FIG. 6F, the second metal layer 114 is patterned by the photolithography method using a third photomask (not shown) to form a source electrode 125 and a drain electrode 126 on the display region.

At the same time, second connecting lines CL2 are formed on the second peripheral region S2. Each of the second connecting lines S2 is electrically connected to the corresponding even numbered scan lines through the second contact hole.

The ohmic contact pattern 124 is removed by a reactive ion etching (RIE) method. Then, the active pattern region is exposed between the source electrode 125 and drain electrode 127.

Therefore, the TFT 120, which includes the gate electrode 121, the active pattern 123, the ohmic contact pattern 124, the source electrode 125 and the drain electrode 126, are formed in the display region D. In addition, the first and second connecting lines CL1 and CL2 are formed in the second peripheral region S2.

Each of the second connecting lines CL2 may be disposed between two adjacent first connecting lines and may partly overlap with two first connecting lines.

Figure 6G:
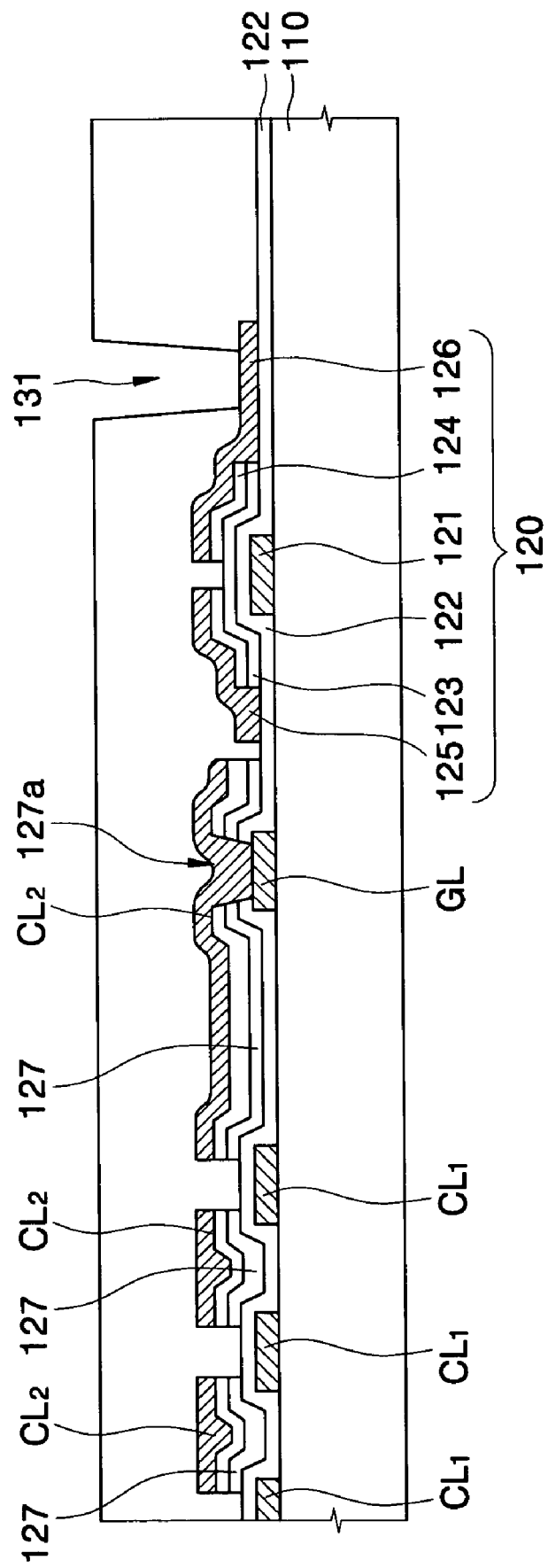

Referring to FIG. 6G, a photosensitive organic resist such as an acryl resin is coated on the whole surfaces of the display region D and the second peripheral region S2 of the first substrate 110 by a spin coating method or a slit coating method, so that an photosensitive organic insulation layer is formed.

Then, the photosensitive organic insulation layer is exposed and is developed by means of a fourth mask (not shown) to form an organic insulation layer 130 having a first contact hole 131. The first contact hole 131 exposes the drain electrode 126 of the TFT 120.

Referring again to FIG. 5, a transparent conductive film such as indium tin oxide (ITO) or indium zinc oxide (IZO) is deposited on the drain electrode 126 that is exposed by the organic insulation layer 130 and the first contact hole 131.

The transparent conductive film is patterned via a photolithography process using a fifth photomask (not shown) to form a pixel electrode 140 on the display region D. The pixel electrode 140 is electrically connected to the drain electrode 126 through the first contact hole 131.

Figure 7A:
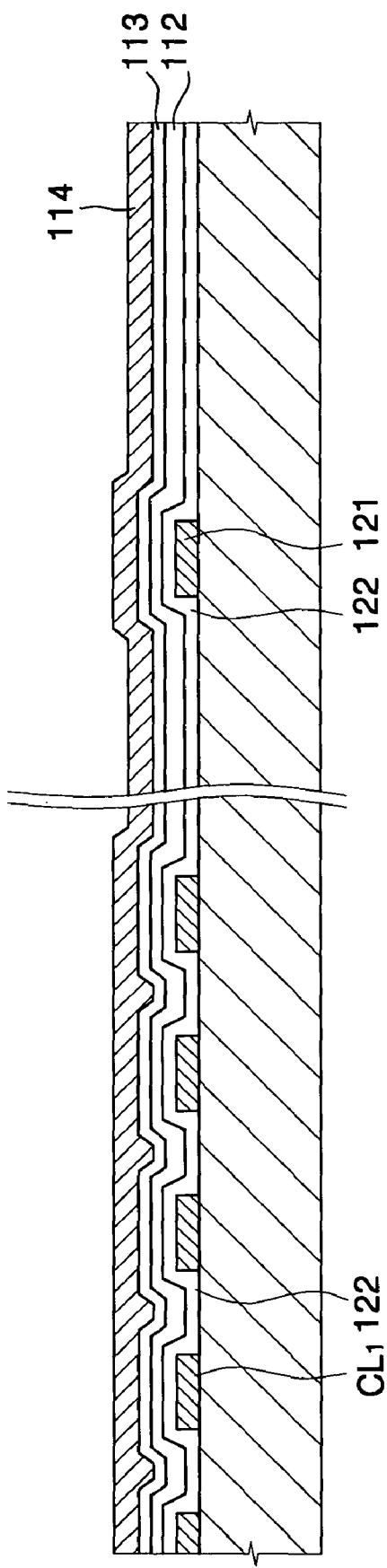

FIGS. 7A, 7B and 7C are sectional views showing another exemplary method of manufacturing the TFT substrate of FIG. 5. The previous steps before the step shown in FIG. 7A are the same as the steps shown in FIGS. 6A, 6B and 6C. The TFT substrate of FIG. 5 is manufactured by four photomasks.

Referring to FIG. 7A, a second metal layer 114 such as chrome (Cr) is deposited on an ohmic contact pattern 113.

As shown in FIG. 7B, the second metal layer 114, the ohmic contact layer 113 and the active layer 112 are patterned to form an ohmic contact pattern 124, an active pattern 123, the source electrode 125 and the drain electrode 126 on the display region D.

In addition, second connecting lines CL2 and an insulating interlayer 127 are formed in the second peripheral region S2. The second connecting lines CL2 are connected to the even numbered scan lines and each of the second connecting lines CL2 are spaced apart from each other. The insulating interlayer 127 disposed between the second connecting lines CL2 and the gate insulation layer 122.

The ohmic contact pattern 124 exposed between the source electrode 125 and the drain electrode 126 is removed. Therefore, the active pattern is exposed between the source electrode 125 and the drain electrode 126, and the active pattern serves as a channel region of the TFT 120.

Next, referring to FIG. 7C, a photosensitive organic resist such as acryl resin is coated on the whole surfaces of the display region D and the second peripheral region S2 of the first substrate 110 by a spin coating method or a slit coating method, so that an photosensitive organic insulation layer is formed.

Then, the photosensitive organic insulation layer is exposed and is developed by means of a third mask (not shown) to form an organic insulation layer 130 having a first contact hole 131. The first contact hole 131 exposes the drain electrode 126 of the TFT 120.

Referring again to FIG. 5, a transparent conductive film such as indium tin oxide (ITO) or indium zinc oxide (IZO) is deposited on the drain electrode 126 that is exposed by the organic insulation layer 130 and the first contact hole 131.

The transparent conductive film is patterned via a photolithography process using a fourth photomask (not shown) to form a pixel electrode 140 on the display region D. The pixel electrode 140 is electrically connected to the drain electrode 126 through the first contact hole 131.

Figure 8:
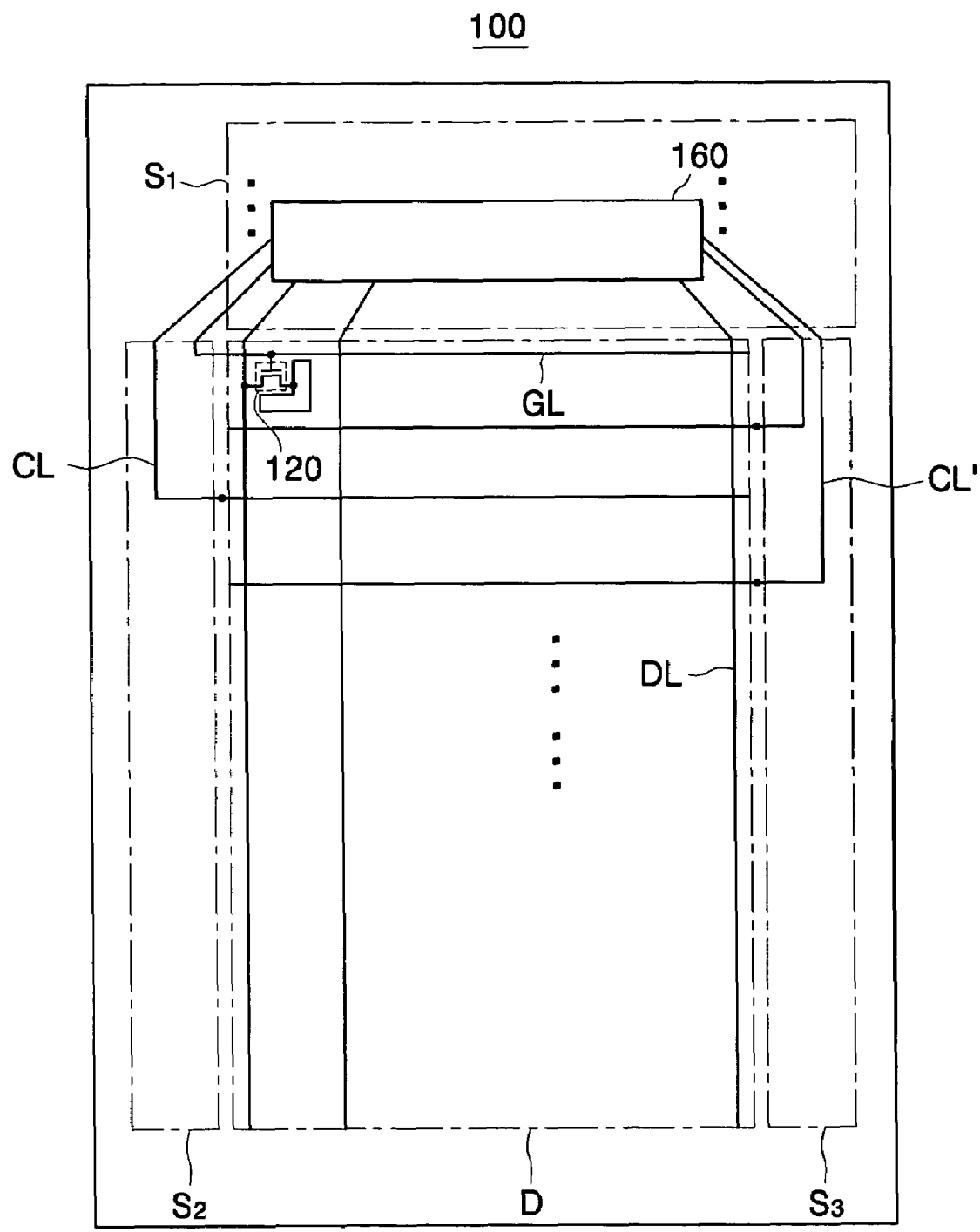
FIG. 8 is a plan view showing a TFT substrate according to another exemplary embodiment of the present invention.

FIG. 8 is a plan view showing a TFT substrate according to another exemplary embodiment of the present invention, and FIG. 9 is a schematic view showing the wirings branched from a driver section of FIG. 8.

Referring to FIGS. 8 and 9, the TFT substrate 100 includes a first peripheral region S1, a second peripheral region S2 and a third peripheral region S3. The first, second and third peripheral regions (S1, S2, S3) are formed adjacent to the display region D.

A plurality of scan lines (SL, or gate lines GL) and a plurality of data lines (DL) are formed on the display region D. The scan lines are extended in a first direction, and the data lines (DL) are extended in a second direction substantially perpendicular to the first direction.

Pixel regions (or pixels) are defined by the scan lines and the data lines, and the pixel regions respectively include a TFT 120 and a pixel electrode 140 connected to drain electrode of the TFT 120.

First ends of the scan lines are disposed on the second peripheral region S2, first ends of data lines DL are disposed on the first peripheral region S2, and second ends of the scan lines are disposed on the third peripheral region S3.

A driver section 150 is arranged in the first peripheral region S1. The driver section 150 may be a driver chip. The driver section 150 includes a first scan driver circuit (or a first gate driver circuit), a second scan driver circuit (or a second gate driver circuit) and a data driver circuit. The first scan driver circuit sequentially provides the odd numbered scan lines (or gate lines) with a first scan driving signal. The second scan driver circuit sequentially provides the even numbered scan lines (or gate lines) with a second scan driving signal. The data driver circuit provides the data lines with a data signal.

In addition, left connecting lines CL are formed in the second peripheral region S2. The left connecting lines CL provides the odd numbered scan lines with the first scan driving signal outputted from the first scan driver circuit. The left connecting lines CL includes first connecting lines CL1 and second connecting lines CL2. The first connecting lines CL1 are formed from the same layer as the gate electrode 121, the second connecting lines CL2 are formed from the same layer as the drain electrode 126. The first connecting lines CL1 and the second connecting lines CL2 are insulated from each other by means of the gate insulation layer 122. The first connecting lines CL1 and the second connecting lines CL2 are alternately connected to odd numbered scan lines.

Right connecting lines CL' are formed in the third peripheral region S3. The right connecting lines CL' provides the even numbered scan lines with the second scan driving signal outputted from the second scan driver circuit. The right connecting lines CL' includes third connecting lines CL3 and fourth connecting lines CL4. The third connecting lines CL3 are formed from the same layer as the first connecting lines CL1, the fourth connecting lines CL4 are formed from the same layer as the second connecting lines CL2. The third connecting lines CL3 and the fourth connecting lines CL4 are alternately connected to even numbered scan lines.

As shown in FIG. 9, each of the second connecting lines CL2 may be disposed between two first connecting lines and partly overlap with two first connecting lines. In addition, each of the fourth connecting lines CL4 may be disposed between two third connecting lines and partly overlap with two third connecting lines CL3.

Therefore, the width of the second peripheral region S2 and the width of the third peripheral region S3 are reduced, and the total area of the peripheral region of the liquid crystal display device may be reduced.

Although above preferred embodiments discuss the liquid crystal display device, the organic electroluminescence device could be utilized.

This invention has been described with reference to the exemplary embodiments. It is evident, however, that many alternative modifications and variations will be apparent to those having skill in the art in light of the foregoing description. Accordingly, the present invention embraces all such alternative modifications and variations as fall within the spirit and scope of the appended claims.

What is claimed is:

1. A substrate for a display device, the substrate comprising:
    a first substrate including a display region and a peripheral region adjacent to the display region, the display region having a plurality of pixels, a plurality of data lines and a plurality of scan lines, the peripheral region having a first peripheral region adjacent to first ends of the data lines and a second peripheral region adjacent to first ends of the scan lines;
    a driver section including a scan driver circuit and a data driver circuit, the scan driver circuit and the data driver circuit formed in the first peripheral region, the scan driver circuit providing the scan lines with a scan driving signal, and the data driver circuit providing the data lines with a data signal; and
    a first connecting part, formed in the second peripheral region to be coupled to the first ends of the scan lines, the first connecting part including a plurality of groups, each of the groups disposed in layers different from each other, the scan driving signal being applied to the first connecting part;
    wherein the first connecting part includes a first group having a plurality of first connecting lines and a second group having a plurality of second connecting lines; and
    wherein each of the first connecting lines partly overlaps with at least one of the second connecting lines.

2. The substrate of claim 1, wherein the first connecting lines are formed from a same layer as the scan lines and the second connecting lines are formed from a same layer as the data lines.

3. The substrate of claim 2, wherein the substrate further comprises a first insulation layer, interposed between the first and second connecting lines, for electrically insulating the first connecting lines from the second connecting lines.

4. The substrate of claim 3, wherein the pixels respectively include a switching device coupled to one of the data lines and one of the scan lines, the switching device has a control electrode, a first current electrode, a second current electrode, a second insulation layer, a semiconductor layer, a second insulating layer formed on the control electrode, the semiconductor layer formed on the second insulation layer, the first and second current electrodes formed on the semiconductor layer to be separated from each other by a predetermined distance.

5. The substrate of claim 4, wherein the first insulation layer is a same layer as the second insulation layer.

6. The substrate of claim 4, wherein the first insulation layer includes the second insulation layer and the semiconductor layer.

7. The substrate of claim 6, wherein the semiconductor layer is formed underlying the first connecting lines.

8. The substrate of claim 3, wherein the first insulation layer includes a contact hole for exposing the first ends of the scan lines so that the first connecting lines are electrically connected to the first ends of the scan lines through the contact hole.

9. The substrate of claim 1, wherein the substrate further includes a second connecting part, the second connecting part is formed in a third peripheral region, is coupled to second ends of the scan lines and includes a plurality of third groups disposed in layers different from each other, the third peripheral region is adjacent to the second ends of the scan lines, the scan driving signal is applied to the second connecting part.

10. The substrate of claim 9, wherein the first connecting part is electrically coupled to odd numbered scan lines, and the second connecting part is electrically coupled to even numbered scan lines.

11. A liquid crystal display device comprising:
a liquid crystal display panel including a first substrate, a second substrate facing the first substrate, and a liquid crystal layer disposed between the first and second substrates, the first substrate including a display region and a peripheral region adjacent to the display region, the display region having a plurality of pixels, a plurality of data lines and a plurality of scan lines, the peripheral region having a first peripheral region adjacent to first ends of the data lines and a second peripheral region adjacent to first ends of the scan lines;
a driver section including a scan driver circuit and a data driver circuit, the scan driver circuit and the data driver circuit formed in the first region, the scan driver circuit providing the scan lines with a scan driving signal, and the data driver circuit providing the data lines with a data signal; and
a first connecting part, formed in the second region to be coupled to the first ends of the scan lines, the first connecting part including a plurality of groups, each of the groups disposed in layers different from each other, the scan driving signal being applied to the first connecting part;
wherein the first connecting part includes a first group having a plurality of first connecting lines and a second group having a plurality of second connecting lines; and
wherein each of the first connecting lines partly overlaps with at least one of the second connecting lines.

12. The substrate of claim 11, wherein the first connecting lines are formed from a same layer as the scan lines and the second connecting lines are formed from a same layer as the data lines.

13. The substrate of claim 11, wherein the substrate further comprises a first insulation layer, interposed between the first and second connecting lines, for electrically insulating the first connecting lines from the second connecting lines.

14. The substrate of claim 13, wherein the pixels respectively include a switching device coupled to one of the data lines and one of the scan lines, the switching device has a control electrode, a first current electrode, a second current electrode, a second insulation layer, a semiconductor layer, the second insulating layer formed on the control electrode, the semiconductor formed on the second insulation layer, the first and second current electrode formed on the semiconductor layer to be separated from each other by a predetermined distance.

15. The substrate of claim 14, wherein the first insulation layer is a same layer as the second insulation layer.

16. The substrate of claim 14, wherein the first insulation layer includes the second insulation layer and the semiconductor layer.

17. The substrate of claim 16, wherein the semiconductor layer is formed underlying the first connecting lines.

18. The substrate of claim 13, wherein the first insulation layer includes a contact hole for exposing the first ends of at least one of the scan lines so that the first connecting lines are electrically coupled to the first ends of said at least one of the scan lines through the contact hole.

19. The substrate of claim 11, wherein the substrate further includes a second connecting part, the second connecting part is formed in a third peripheral region, is coupled to second ends of the scan lines and includes a plurality of third groups disposed in layers different from each other, the third peripheral region is adjacent to the second ends of the scan lines, and the scan driving signal is applied to the second connecting part.

20. The substrate of claim 19, wherein the first connecting part is electrically coupled to odd numbered scan lines, and the second connecting part is electrically coupled to even numbered scan lines.

21. A method of manufacturing a liquid crystal display device, the method comprising:
forming a first substrate including a display region and a peripheral region adjacent to the display region, the display region having a plurality of data lines, a plurality of scan lines, and a plurality of pixels, each of the pixels having a switching device electrically coupled to one of the scan lines and one of the data lines, wherein forming a first substrate comprises:
forming a first metal layer in the display region and the peripheral region;
patterning the first metal layer to form the scan lines and gate electrodes branched from the scan lines on the display region and to form a plurality of first connecting lines in the peripheral region so that the first connection lines are electrically and directly coupled to a first group of the scan lines;
forming an insulation layer, an active layer and a contact layer on the first substrate on which the scan lines, the gate electrodes, and the first connecting lines are formed;
patterning the active layer and the contact layer to form an active pattern and a contact pattern;
forming a second metal layer on the first substrate on which the insulation layer, the active pattern, and the contact pattern are formed; and
patterning the second metal layer to form the data lines, source electrodes branched from the data lines, and drain electrodes spaced apart from the source electrode on the display region, and to form a plurality of second connecting lines in the peripheral region so that the second connecting lines are electrically and directly coupled to a second group of the scan lines, wherein each of the first connecting lines partly overlaps with at least one of the second connecting lines;
combining the first substrate with a second substrate; and
interposing a liquid crystal between the first and second substrates.

22. The method of claim 21, wherein the first connecting lines are formed from a same layer as the scan lines; and the second connecting lines are formed from a same layer as the data lines.

23. The method of claim 21, wherein patterning the active layer and the contact layer includes forming a double insulation layer on the peripheral region to be interposed between the insulation layer and the second connecting lines.

24. The method of claim 21, wherein patterning the active layer and the contact layer includes forming a contact hole on the insulation layer, the active layer, and the contact layer so that the contact hole exposes an end of the second group of the scan lines.

25. A substrate for a display device, the substrate comprising:
   a first substrate including a display region and a peripheral region adjacent to the display region, the display region having a plurality of pixels, a plurality of data lines, and a plurality of scan lines disposed on a different layer from the data lines;
   a driver section including a scan driver circuit and a data driver circuit, the scan driver circuit and the data driver circuit formed in the peripheral region, the scan driver circuit providing the scan lines with a scan driving signal, and the data driver circuit providing the data lines with a data signal; and
   a connecting part formed in a portion of the peripheral region adjacent to first ends of the scan lines to be coupled to the first ends of the scan lines, the connecting part including a first group having a plurality of first connecting lines formed from a same layer as the scan lines and a second group having a plurality of second connecting lines formed from a same layer as the data lines, the scan driving signal being applied to the connecting part, wherein each of the first connecting lines partly overlaps with at least one of the second connecting lines.

26. A method of manufacturing a liquid crystal display device, the method comprising:
   forming a first substrate including a display region and a peripheral region adjacent to the display region, the display region having a plurality of data lines, a plurality of scan lines, and a plurality of pixels, each of the pixels having a switching device electrically coupled to one of the scan lines and one of the data lines, wherein forming a first substrate comprises:
      forming a first metal layer in the display region and the peripheral region;
      patterning the first metal layer to form the scan lines and gate electrodes branched from the scan lines on the display region, and to form first connecting lines in the peripheral region, the first connecting lines being electrically coupled to first ends of the scan lines;
      forming an insulating layer, an active layer, a contact layer, and a second metal layer on the first substrate on which the scan lines, the gate electrodes, and the first connecting lines are formed; and
      patterning the active layer, the contact layer, and the second metal layer to form an active pattern and a contact pattern on each of the gate electrodes, to form the data lines, source electrodes branched from the data lines, and drain electrodes spaced apart from the source electrodes on the display region, and to form second connecting lines in the peripheral region, the second connecting lines being electrically coupled to second ends of the scan lines, wherein each of the first connecting lines partly overlaps with at least one of the second connecting lines;
   combining the first substrate with a second substrate; and
   interposing a liquid crystal between the first and second substrate,
   wherein the first connecting lines are formed from a same layer as the scan lines and the second connecting lines are formed from a same layer as the data lines.

* * * * *